US006738494B1

(12) United States Patent
Savakis et al.

(10) Patent No.: US 6,738,494 B1
(45) Date of Patent: May 18, 2004

(54) METHOD FOR VARYING AN IMAGE PROCESSING PATH BASED ON IMAGE EMPHASIS AND APPEAL

(75) Inventors: Andreas E. Savakis, Rochester, NY (US); Stephen Etz, Venice, FL (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 620 days.

(21) Appl. No.: 09/602,865

(22) Filed: Jun. 23, 2000

(51) Int. Cl.[7] .............................. G06K 9/46; G06T 5/00
(52) U.S. Cl. ...................... 382/100; 382/190; 382/254
(58) Field of Search ................................. 382/190, 206, 382/307, 254, 100, 275, 300

(56) References Cited

U.S. PATENT DOCUMENTS

| | | | |
|---|---|---|---|
| 5,418,895 A | 5/1995 | Lee | 395/131 |
| 5,424,945 A | 6/1995 | Bell | 364/419.2 |
| 5,694,484 A | 12/1997 | Cottrell et al. | 382/167 |
| 5,835,627 A * | 11/1998 | Higgins et al. | 382/167 |
| 5,875,265 A | 2/1999 | Kasao | 382/229 |
| 6,522,418 B2 * | 2/2003 | Yokomizo et al. | 358/1.15 |

* cited by examiner

*Primary Examiner*—Jon Chang
(74) *Attorney, Agent, or Firm*—David M. Woods

(57) ABSTRACT

A method for varying the image processing path for a digital image involves the steps of (a) computing an image processing attribute value for the digital image based on a determination of the degree of importance, interest or attractiveness of the image; and (b) using the image processing attribute value to control the image processing path for the image. In one embodiment, the image processing attribute value is based on an appeal value determined from the degree of importance, interest or attractiveness that is intrinsic to the image. In another embodiment, wherein the image is one of a group of digital images, the image processing attribute value is based on an emphasis value determined from the degree of importance, interest or attractiveness of the image relative to other images in the group of images.

24 Claims, 12 Drawing Sheets

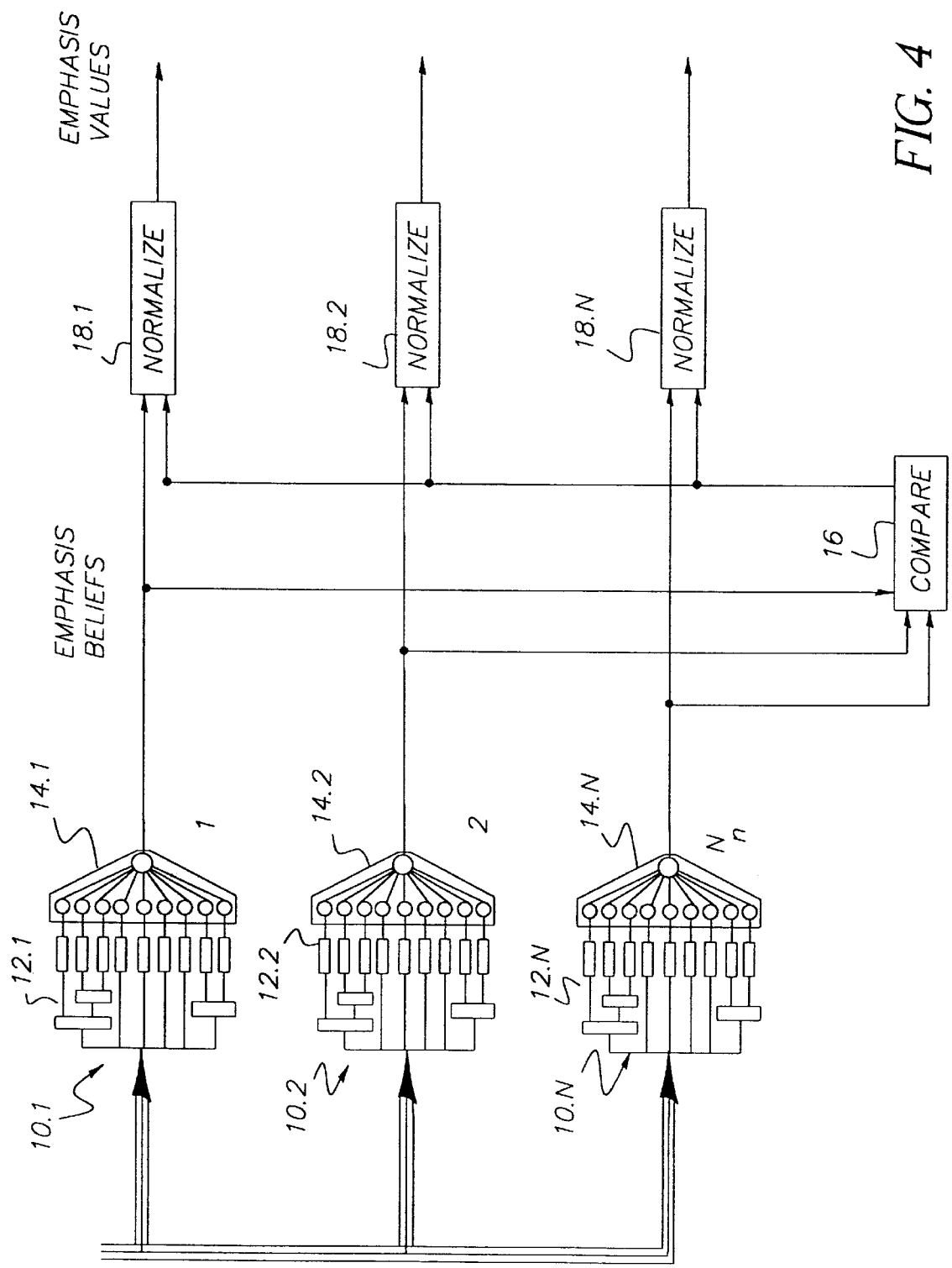

METHOD FOR VARYING AN IMAGE PROCESSING PATH BASED ON IMAGE EMPHASIS AND APPEAL

FIELD OF THE INVENTION

The invention relates generally to the field of image processing, and in particular to the field of image assessment and understanding.

BACKGROUND OF THE INVENTION

Image assessment and understanding deal with problems that are easily solved by human beings given their intellectual faculties but are extremely difficult to solve by fully automated computer systems. Image understanding problems that are considered important in photographic applications include main subject detection, scene classification, sky and grass detection, people detection, automatic detection of orientation, etc. In a variety of applications that deal with a group of pictures, it is important to rank the images in terms of a logical order, so that they can be processed or treated according to their order. A photographic application of interest is automatic albuming, where a group of digital images are automatically organized into digital photo albums. This involves clustering the images into separate events and then laying out each event in some logical order, if possible. This order implies at least some attention to the relative content of the images, i.e., based on the belief that some images would likely be preferred over others.

A number of known algorithms, such as dud detection, event detection and page layout algorithms, are useful in connection with automatic albuming applications. Dud detection addresses the elimination, or de-emphasis, of duplicate images and poor quality images, while event detection involves the clustering of images into separate events by certain defined criteria, such as date and time. Given a set of images that belong to the same event, the objective of page layout is to layout each event in some logical and pleasing presentation, e.g., to find the most pleasing and space-efficient presentation of the images on each page. It would be desirable to be able to select the most important image in the group of images, e.g., the one that should receive the most attention in a page layout.

Due to the nature of the image assessment problem, i.e., that an automated system is expected to generate results that are representative of high-level cognitive human (understanding) processes, the design of an assessment system is a challenging task. Effort has been devoted to evaluating text and graphical data for its psychological effect, with the aim of creating or editing a document for a particular visual impression (see, e.g., U.S. Pat. Nos. 5,875, 265 and 5,424,945). In the '265 patent, a system analyzes an image, in some case with the aid of an operator, to determine correspondence of visual features to sensitive language that is displayed for use by the operator. The difficulty in this system is that the visual features are primarily based on low level features, i.e., color and texture, that are not necessarily related to image content, and a language description is difficult is to use for relative ranking of images. The '945 patent discloses a system for evaluating the psychological effect of text and graphics in a document. The drawback with the '945 patent is that it evaluates the overall visual impression of the document, without regard to its specific content, which reduces its usefulness for developing relative ranking. Besides their complexity and orientation toward discernment of a psychological effect, these systems focus on the analysis and creation of a perceptual impression rather than on the assessment and utilization of an existing image.

In digital imaging systems that process photographic images from a customer order, the same image processing path, or series of image processing steps, is usually applied to all the digital images related to that customer order. For example, in performing noise cleaning or interpolation on the digital signals obtained from such images, the same noise cleaning algorithm and the same interpolation algorithm is ordinarily applied to each of the photographic images from the order.

U.S. Pat. No. 5,694,484 (Cottrell et al.) describes a system involving several image processing modules and a method for selecting an image processing parameter that will optimize image quality for a given digital image, using information about the image capture device and the intended image output device. The method involves calculating an image quality metric that can be expressed as a series of mathematical transformations. The parameters used to control the image processing modules are varied, the image quality metric is calculated for each permutation of the control parameters, and the control parameters setting which yielded the best value of the image quality metric are used to process the digital image. The method described by Cottrell et al is performed on an individual digital image basis and therefore does not include an assessment of the quality of a digital image in either a relative or absolute basis relative to other digital images.

What is needed is an automatic digital imaging algorithm which can make an intelligent decision without user input as to which images within a set of images should be given preferential image processing treatment.

SUMMARY OF THE INVENTION

The present invention is directed to overcoming one or more of the problems set forth above. Briefly summarized, according to one aspect of the present invention, a method is disclosed for varying the image processing path for a digital image involving the steps of (a) computing an image processing attribute value for the digital image based on a determination of the degree of importance, interest or attractiveness of the image; and (b) using the image processing attribute value to control the image processing path for the image. In one embodiment, the image processing attribute value is based on an appeal value determined from the degree of importance, interest or attractiveness that is intrinsic to the image. In another embodiment, wherein the image is one of a group of digital images, the image processing attribute value is based on an emphasis value determined from the degree of importance, interest or attractiveness of the image relative to other images in the group of images.

The determination of the degree of importance, interest or attractiveness of an image is based on an assessment of the image with respect to certain features, wherein one or more quantities are computed that are related to one or more features in each digital image, including one or more features pertaining to the content of the individual digital image. The quantities are processed with a reasoning algorithm that is trained on the opinions of one or more human observers, and an output is obtained from the reasoning algorithm that assesses each image. In a dependent aspect of the invention, the features pertaining to the content of the digital image include at least one of people-related features and subject-related features. Moreover, additional quantities may be computed that relate to one or more objective measures of the digital image, such as colorfulness or sharpness. The results of the reasoning algorithm are processed to rank order the quality of each image in the set of images. The image processing modules applied to each digital image are varied based on the degree of importance, interest or attractiveness of the image, determined as by itself or as related to the group of digital images.

From another aspect, the invention may be seen (a) as a method for varying an image processing path for a digital image based on a determination of the appeal of the image with respect to certain self-salient features, wherein appeal is an assessment of the degree of importance, interest or attractiveness of an individual image or (b) as a method for varying an image processing path for a digital image based on a determination of the emphasis of an image with respect to certain features, wherein emphasis is an assessment of the degree of importance, interest or attractiveness of an individual image relative to other images in a group of images. From this perspective, for both appeal and emphasis assessment, self-salient image features are calculated, such as:

a. People related features: the presence or absence of people, the amount of skin or face area and the extent of close-up based on face size.

b. Objective features: the colorfulness and sharpness of the image.

c. Subject related features: the size of main subject and the goodness of composition based on main subject mapping.

While the above-noted features are adequate for emphasis assessment, it is preferable that certain additional relative-salient image features are considered for appeal assessment, such as:

a. The representative value of each image in terms of color content.

b. The uniqueness of the picture aspect format of each image.

An assessment of an image is obtained with a reasoning engine, such as a Bayesian network, which accepts as input the above-noted features and is trained to generate image assessment values. This assessment may be an intrinsic assessment for individual images, in which case the self-salient features are processed by a Bayesian network trained to generate the image appeal values, or the assessment may be a relative assessment for a group of images, in which case the self-salient and, optionally, the relative-salient features are processed by a Bayesian network trained to generate image emphasis values.

The advantage of the invention lies in its ability to perform an assessment of one or more images and accordingly vary the image processing path of a digital image without human intervention. In a variety of applications that deal with a group of pictures, such an algorithmic assessment enables the automatic control of image processing, so that the images can be more efficiently processed or treated according to their rank order.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a block diagram of a network architecture for calculating the relative emphasis values of a group of images;

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the method and system as shown and described according to the invention in the following materials, software not specifically shown, described or suggested herein that is useful for implementation of the invention is conventional and within the ordinary skill in such arts.

For purpose of this disclosure, a digital image may be thought of as including one or more digital image channels. Each digital image channel is comprised of a two-dimensional array of pixels, where each pixel value relates to the amount of light received by the imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two dimensional array of pixels values arranged by rows and columns, those skilled in the art will recognize that the present invention can be applied to mosaic (non rectilinear) arrays with equal effect. Moreover, the signals comprising each digital image channel may originate from a variety of capture devices, such as area or linear arrays.

Digital Image Processing System

Figure 11:
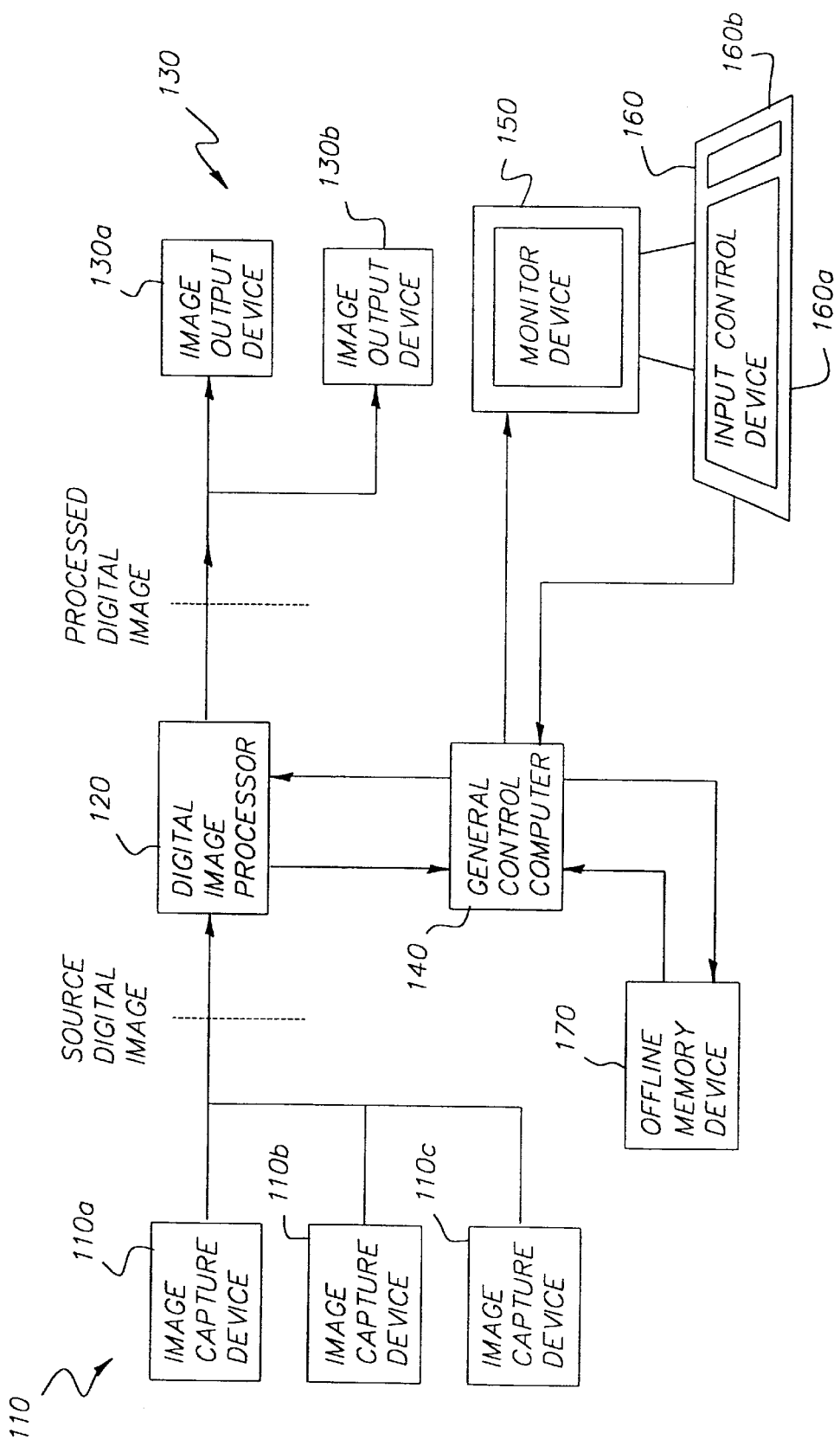
FIG. 11 is a perspective diagram of a computer system for practicing the invention using the components and methods set forth in the preceding Figures.

The present invention may be implemented in computer hardware. Referring to FIG. 11, the following description relates to a digital imaging system which includes one or more image capture devices 110, a digital image processor 120, one or more image output devices 130, and a general control computer 140. Those skilled in the art will recognize that the present invention may also be practiced with an analog optical printing system, wherein the image output device may be an optical printer. The system may include a monitor device 150 such as a computer console or a paper printer (not shown). The system may also include an input control device 160 for an operator such as a keyboard 160a and/or a mouse pointer 160b. Still further, as used and disclosed herein, the present invention may be implemented as a computer program and may be stored in a computer memory device 170, i.e., a computer readable storage medium, which may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such as a personal computer.

Multiple capture devices 110 (shown in FIG. 11 as separate devices 110a, 110b and 110c) are shown to illustrate that the present invention may be used for digital images derived from a variety of imaging devices. For example, FIG. 11 may represent a digital photofinishing system where the image capture device 110 is a film scanner device which produces digital images by scanning a conventional photographic image, e.g., color negative film or slide film transparencies. The digital image processor 120 provides the means for processing the digital images to produce suitably looking images (e.g., pleasing looking or otherwise modified for a particular purpose) on the intended output device or media. Multiple image output devices 130 (shown as devices 130a and 130b) are shown to illustrate that the present invention may be used in conjunction with a variety of output devices, e.g., a digital photographic printer and/or a soft copy display. The digital image processor 120 adjusts the source digital images in a manner such that a suitably looking image is produced by the image output device 130. The interaction between these processing steps is explained in more detail below.

Figure 12:
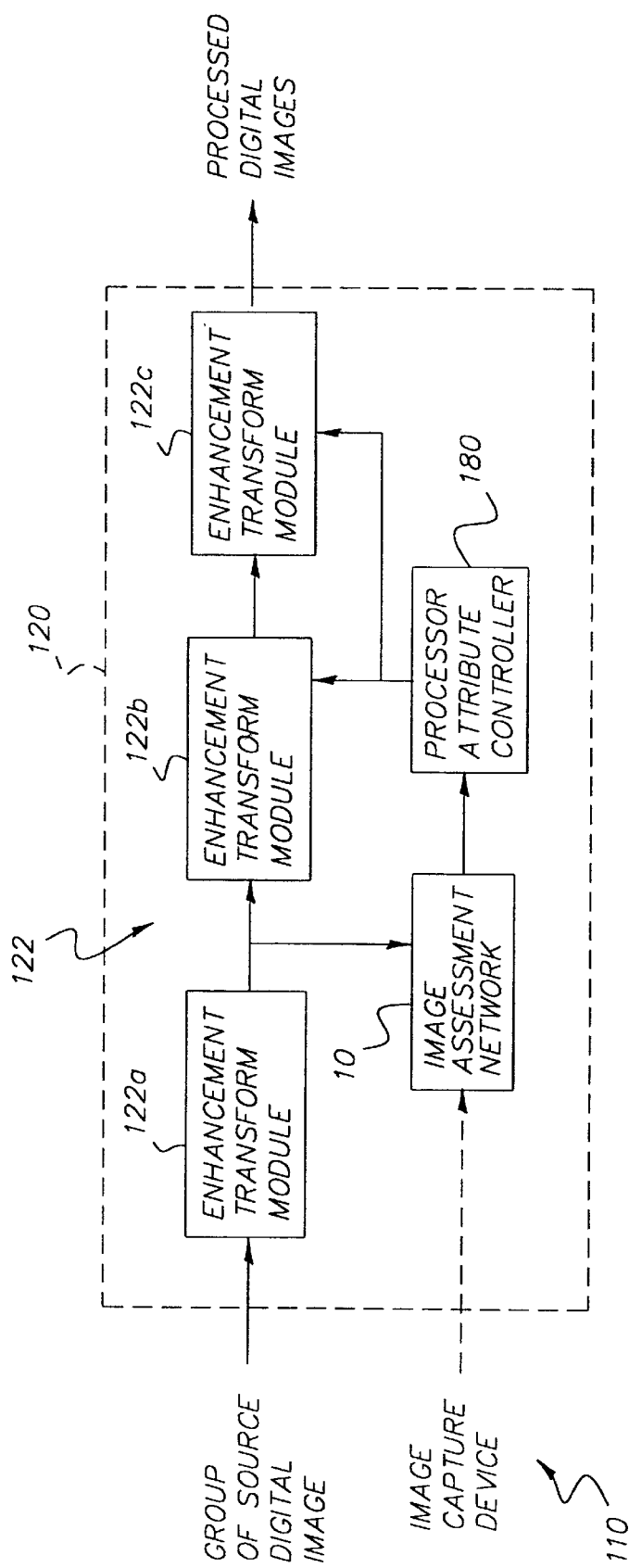
FIG. 12 is a block diagram showing further details of the image processing system set forth in FIG. 11 for practicing the invention.

The digital image processor 120 shown in FIG. 11 is illustrated in more detail in FIG. 12. The general form of the digital image processor 120 employed by the present invention contains a cascaded chain of image processing modules 122 (shown as a plurality of separate modules 122a, 122b, and 122c). Each source digital image is received by the digital image processor 120, which produces an output processed digital image. Each image processing module 122 contained within the digital image processor 120 is adapted to receive a digital image, to modify the digital image or derive some information from the digital image, and provide its output processed digital image to the next image processing module. As shown in FIG. 12, the image processing module 122 includes, but is not limited to, three enhancement transform modules 122a, 122b and 122c, which are configured as first and second sets in which the second set of modules 122b and 122c can receive digital images from the first set including module 122a. Examples of enhancement transform modules 122a, 122b and 122c might include, but are not limited to, modules designed to sharpen spatial detail, remove noise, enhance color, and enhance the tone scale of a digital image.

Referring to FIG. 12, an image assessment network 10 receives a group of digital images from either the image capture device 110 shown in FIG. 11 or the output from the enhancement transform module 122a shown in FIG. 12. The image assessment network 10 calculates an assessment value, which is preferably a single numerical number, indicating the overall importance, interest or attractiveness of each digital image, either by itself or in relation to other images in a group of images. For analog optical printing applications, the assessment values indicate of the overall importance, interest or attractiveness of the individual original images that will be produced from the film negatives. The individual assessment value corresponding to each image taken by itself will be referred to as its appeal value, and the values thereof for all images as the set of appeal values. The individual assessment value corresponding to each image in relation to other images in the group of images will be referred to as its emphasis value, and the values thereof for all images as the set of emphasis values.

The processing attribute controller 180 receives the set of emphasis values and appeal values, analyzes these values, and produces an image processing attribute value for each digital image in the group of digital images. These image processing attribute values are received by the enhancement transform modules 122b and 122c and are used to vary or control the image processing steps within the corresponding enhancement transform module.

Networked Computer System

The present invention may be implemented with multiple computers connected via a computer network such as, but not limited to, the internet as accessed via the World Wide Web. As part of the digital image processing procedures involved in the practice of the present invention, two central processing functionalities are embodied: 1) the calculation of an assessment (emphasis or appeal) value derived from the pixel values contained in each digital image and 2) the calculation of a processing attribute value. One or both of these central elements may be achieved in a single computer; however, it is possible for the calculation of the assessment values and the calculation of the processing attribute values to be performed on different computers while a third computer system performs the output functions, e.g., printing.

Figure 13:
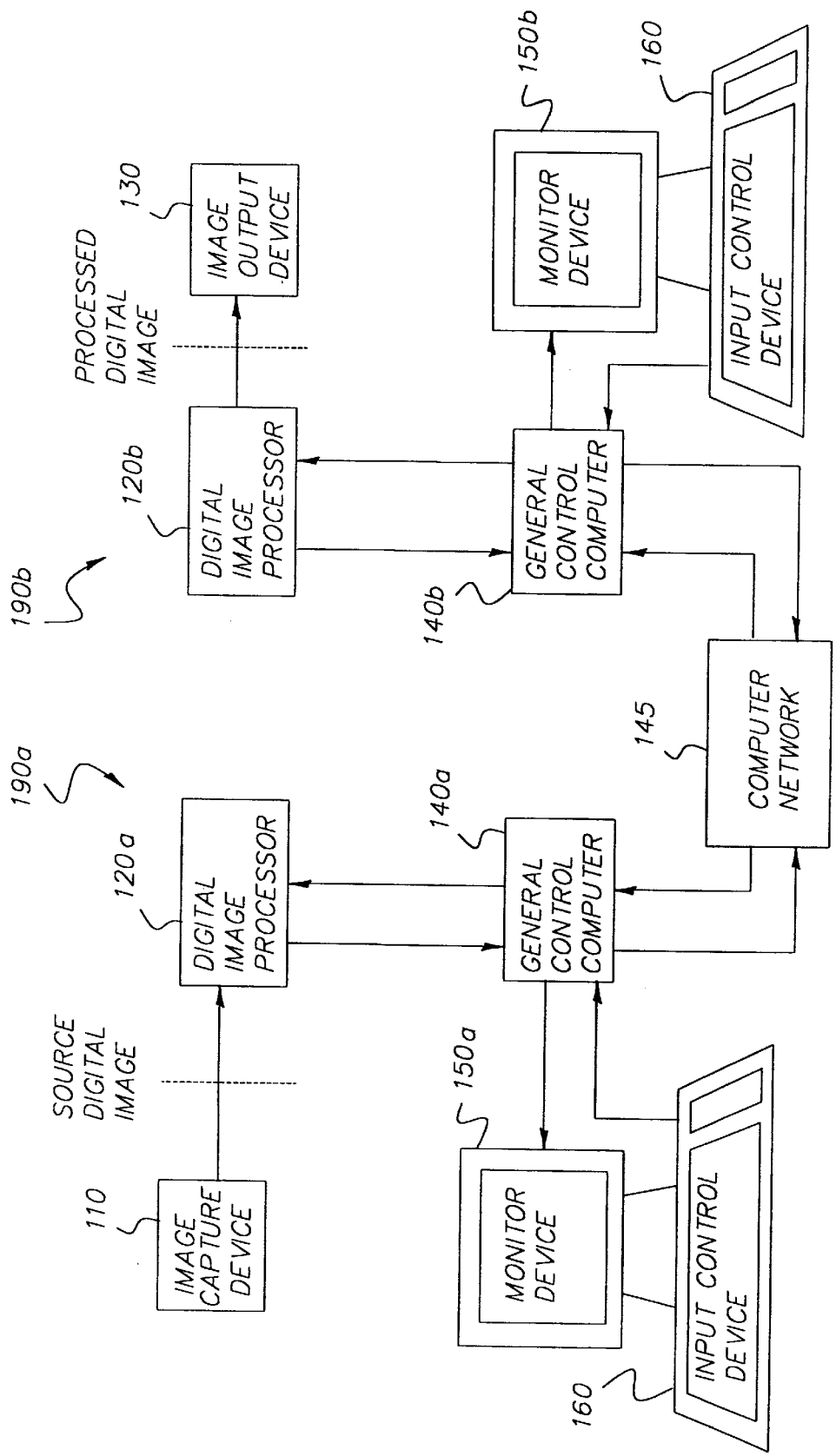
FIG. 13 is a block diagram showing a computer internet image processing system suitable for practicing the invention.

The diagram illustrated in FIG. 13 shows two computer systems as depicted in FIG. 11 connected together via a computer network 145. Referring to FIG. 13, one of the computer systems 190a is shown with an image capture device 110 connected to its digital image processor 120a while the other computer system 190b is shown with an image output device 130 connected to its digital image processor 120b. The image capture device 110 produces a digital image which is received and processed by the connected digital image processor 120a. A set of assessment values is calculated in the digital image processor 120a. The source digital image and the assessment values are transmitted to the second computer system 190b over the computer network 145. The digital image processor 120b of the second computer system 190b receives the source digital image and uses the assessment values to calculate the processing attribute values for each image and transform the digital images in a manner such that a suitably looking image is produced by the image output device 130.

Although two computer systems 190a and 190b are shown in FIG. 13, the present invention may be practiced with more than two computer systems. It is possible to practice the present invention with a first computer system capturing the source digital image, the source digital image then being received by a second computer system which calculates the assessment values, a third computer system then receiving the assessment values and the source digital image and calculating the processing attribute values, and a fourth computer system which receives the processing attribute values and produces a visual display of the processed digital images.

The assessment values and processing attribute values are examples of image meta-data, i.e., a piece of non-pixel information related to a digital image. Image meta-data may be used for such purposes as, but not limited to, conveying information about how the digital image was captured, adding context to the meaning of the digital image such as the photographer's annotation, or adding analysis information about the digital image. In one embodiment of the present invention, these assessment values are transmitted as image meta-data over a computer network to enable a different computer system to use the image meta-data to control the processing of the digital images.

FIG. 13 can thus be understood to describe a web-based processing architecture enabling on-line image processing and ordering utilizing a variety of image processing algorithms and modules, including those described herein. In this connection, it is helpful to view FIG. 13 in terms of a typical client—server setting for a web-based architecture, which includes a server host 190b interconnected via a network 145 (e.g., the Internet) with a client host 190a. Following an appropriate establishment of communication between the client host and the server host, a web server is run on the server computer 140b and a web browser is run on the client computer 140a, causing display on the monitor device 150a of an "request" web page generated by, e.g., an applet. The client application functionality is incorporated into the applet, including, e.g., at least the image emphasis network 10. In addition, the client application may include the processor attribute controller 180 shown in FIG. 12 (or this functionality can be provided by the web server or a utility connected to the web server). The client application is thus loaded and run in the web browser and displayed via the applet and the web browser onto the display 150a.

In operation, a user at the client host 190a inputs a particular image, or a group of images, via the capture device 110 (or from an image store, see below) and selects a particular image processing option via the "request" web page, which causes the applet to generate the assessment and/or attribute values and to instruct the web browser to execute a request to the web server to upload the image and initiate image processing. Alternatively the image may be uploaded from a storage device (not shown) accessible to the user, or may have been provided from a variety of other sources accessible to the server host 190b. The server initiates communications with the digital image processor 120b, which contains the image processing chain. The image output functionality, such as the image output device 130, is also included with the server host 190b, or is accessible as a separate utility service from the server host. The digital image processor 120b performs the appropriate functions in the image processing chain and returns the appropriate response, for instance, the modified images, to the web server, which in turn causes the web server to return the response to the applet. The applet generates a further web page to be displayed in the web browser running on the general control computer 140a. While the web-based architecture described above generates web pages via applets, it should be understood that other means of web page generation, such as via CGI script, can also be utilized in accordance with the invention.

Processing Attribute Value Calculation

The image assessment network 10 generates the emphasis values and/or the appeal values. Let a group of digital images numbered one through n have a corresponding set of emphasis values E, received from the image emphasis network 10, with elements numbered one through n described by $$E=\{e_1, e_2, \ldots, e_n\}$$

where the $e_j$ term refers to the individual emphasis value for the $j^{th}$ digital image. In addition, or alternatively, a set of appeal values A, also corresponding to the n digital images, is received from the image emphasis network 10, with elements numbered one through n described by $$A=\{a_1, a, \ldots, a_n\}$$

where the $a_j$ term refers to the individual appeal value for the $j^{th}$ digital image. The set of emphasis values E represent the relative importance of digital image within the group of digital images. The set of appeal values A relates to the absolute aesthetic quality of the digital images. The processing attribute controller 180 performs a rank ordering processing which sorts the individual assessment values in number order. The process results in a set of rank indices R described by $$R=\{r_1, r_2, \ldots, r_n\}$$

where the $r_j$ term refers to the relative importance of the $j^{th}$ digital image within the group of digital images. For example, R may contain the values $$R=\{5, 2, \ldots, 3\}$$

Where the first digital image in the group of digital images is the fifth most important digital image, the second digital image is the second most important digital image, and the $n^{th}$ digital image is the third most important digital image within the group of digital images.

The set of rank indices R, the set of emphasis values E, or the appeal values A is used to determine a set of image processing attribute values P given by $$P=\{p_1, p_2, \ldots, p_n\}$$

where the $p_j$ term refers to the image processing attribute value of the $j^{th}$ digital image of the group of digital images. The individual image processing attribute values produced by the processing attribute controller 180 are received by the enhancement transform modules 122 shown in FIG. 12. The image processing attribute value received by each enhancement transform module 122 is used to control the image processing steps within the enhancement transform module.

The preferred embodiment of the present invention uses the set of rank indices R subdivided into four subsets or quartiles. The digital images with corresponding emphasis values ranking in the top quartile receive an image processing attribute value of 3, the middle two quartiles receive a value of 2, and the bottom quartile receives a value of 1.

The present invention may be used to control the amount of noise cleaning performed by a noise reduction enhancement transform module 122. An example of a noise reduction algorithm is the Sigma Filter, described by Jon Son Lee in "Digital Image Smoothing and the Sigma Filter", *Computer Vision, Graphics, and Image Processing*, Vol. 24, p. 255–269, 1983. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma Filter can be represented as $$q_{mn} = \Sigma_{ij} a_{ij} p_{ij} / \Sigma_{ij} a_{ij}$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $p_{ij}$ represents the pixels in the local surround about the center pixel $p_{mn}$, $q_{mn}$ represents the noise cleaned pixel, and $\epsilon$ represents a threshold parameter usually set to two times the expected noise standard deviation. The local pixels are sampled from a rectangular region centered about the pixel of interest. The row and column dimensions of the rectangular window, Rdim and Cdim respectively, may be used to control the amount of noise cleaning performed. Changing the size of the local surround about the center pixel alters the computation time required to perform the noise cleaning operation. For example, setting the Rdim and Cdim parameters each to a value of 3 will require approximately one ninth as much computer resources as for the case of setting the Rdim and Cdim parameters each to 9.

For example, digital images with a corresponding image processing attribute value of 3 will be processed with the noise reduction enhancement transform module 122b with the row and column dimensions of the rectangular window Rdim and Cdim set to 7 and 7 respectively. Digital images with a corresponding image processing attribute value of 2 will be processed with the noise reduction enhancement transform module 122c with the row and column dimensions of the rectangular window Rdim and Cdim set to 5 and 5 respectively. Digital images with a corresponding image processing attribute value of 1 will not be processed with the noise reduction enhancement transform modules 122b or 122c (i.e., when the image processing attribute value is 1 both modules 122b and 122c are inactivated and the signal is passed directly through without modification). With the present invention the most important, or best image content, digital images will receive preferential image processing. Thus the enhancement of noise reduction will be most realized for the digital images within the group of digital images that are ranked the highest.

This approach of preferentially treating some digital images from a group of digital images may be used to allocate the computer resources optimally. For example, if control parameters for a given enhancement transform module can be measured with respect to how much computation time is required, an allotment of time may be apportioned according to the emphasis values. The above example would yield approximately the same overall computation time for the group of digital images as setting the Rdim and Cdim parameters each 5 for all images. Those skilled in the art will recognize that the present invention is not limited to methods which keep the total computation time for the group of digital images constant, nor is it limited to the practice of a particular algorithm, such as noise reduction.

For instance, the present invention may be used to control the type of spatial interpolation performed by the enhancement transform modules 122, which for this application will be considered to be interpolation enhancement transfer modules. Spatial interpolation is the process of re-sampling a digital image to change the number of pixels contained in the digital images. An interpolation enhancement transform module 122 is employed in a digital image processor when the number of pixels contained in a digital images does not match the number of pixels expected by an image output device such as a digital printer. Some mathematical algorithms which perform spatial interpolation require more computational resources than others.

Nearest-neighbor spatial interpolation involves re-sampling a digital image by using the value of the pixel from the source digital image which is spatially closest or nearest to the pixel value being created. This method is the computationally fastest. A better quality result may be obtained by employing a bi-linear spatial interpolation algorithm. For this spatial interpolation algorithm a weighted average of the four nearest pixel values from the source digital image are used. This method requires more computational resources than the nearest-neighbor spatial interpolation method. An even more computationally intensive algorithm is the bi-cubic spatial interpolation algorithm. This algorithm involves the combination of a weighted sum of nearest pixel values with a technique which uses the calculated first derivative values of a local pixel region about the pixel of interest. The bi-linear and bi-cubic spatial interpolation algorithms are described in more detail in the reference *Numerical Recipes*, by Press et al. on pages 95 through 101.

Digital images with a corresponding image processing attribute value of 3 will be processed with the bi-cubic interpolation algorithm within an interpolation enhancement transform module 122b. Digital images with a corresponding image processing attribute value of 2 will be processed with the bi-linear interpolation algorithm within an interpolation enhancement transform module 122c. Digital images with a corresponding image processing attribute value of 1 will be processed with the nearest-neighbor interpolation algorithm within yet another interpolation enhancement transform module (not shown separately in FIG. 12). Thus with the present invention, the digital images within the group of digital images with correspondingly high emphasis value rankings will be processed with the more computationally intensive algorithms and thus receive preferential image processing treatment.

An alternative embodiment of the present invention involves assigning image processing attribute values on the basis of appeal values. Experiments with consumer images have shown that images with corresponding appeal values of 0.7 or greater (on a scale of zero to one) are considered to be of significant enjoyment to the consumer as compared with images which have corresponding appeal values of less than 0.7. Thus, in this embodiment, for all the digital images in the group of digital images which have a corresponding appeal value of greater than or equal to 0.7 an attribute value of 2 is assigned. For all the digital images in the group of digital images which have a corresponding appeal value of less than 0.7 an attribute value of 1 is assigned.

Thus, for noise reduction, digital images with corresponding image processing attribute values of 2 will be processed in the enhancement transform module 122 with Rdim and Cdim parameters set to 7 each. Those digital images with corresponding image processing attribute values of 1 will be processed with Rdim and Cdim parameters set to 3 each. Similarly, for interpolation, the digital images with corresponding image processing attribute values of 2 will be processed in the enhancement transform module 122 with the bi-cubic interpolation algorithm while the digital images with corresponding image processing attribute values of 1 will be processed with the bi-linear spatial interpolation algorithm.

Those skilled in the art will recognize that the present invention may also be used to give preferential image processing treatment to those digital images within the group of digital images with the lowest appeal (or emphasis) values. Such a method would most likely be used to preferentially process those digital images with less inherent esthetic quality to raise their processed state quality up to the level of the other digital images within the group of digital images.

Assessment Value Calculation

As described herein, it is important to rank the images in terms of their relative value and/or their intrinsic value, so that they can be processed or treated according to these values. This logical ranking is based upon two related assessments of the images: image appeal and image emphasis. Image appeal is the intrinsic degree of importance, interest or attractiveness of an individual picture; image emphasis, on the other hand, is the relative importance, interest or attractiveness of the picture with respect to other pictures in the group. The assessment algorithm would be expected to operate on the images and assign assessment values (i.e., emphasis and/or appeal values) to each image. The assessment values may be viewed as metadata that are associated with every image in a particular group and may be exploited by other algorithms, such as the aforementioned image processing chain.

Figure 1:
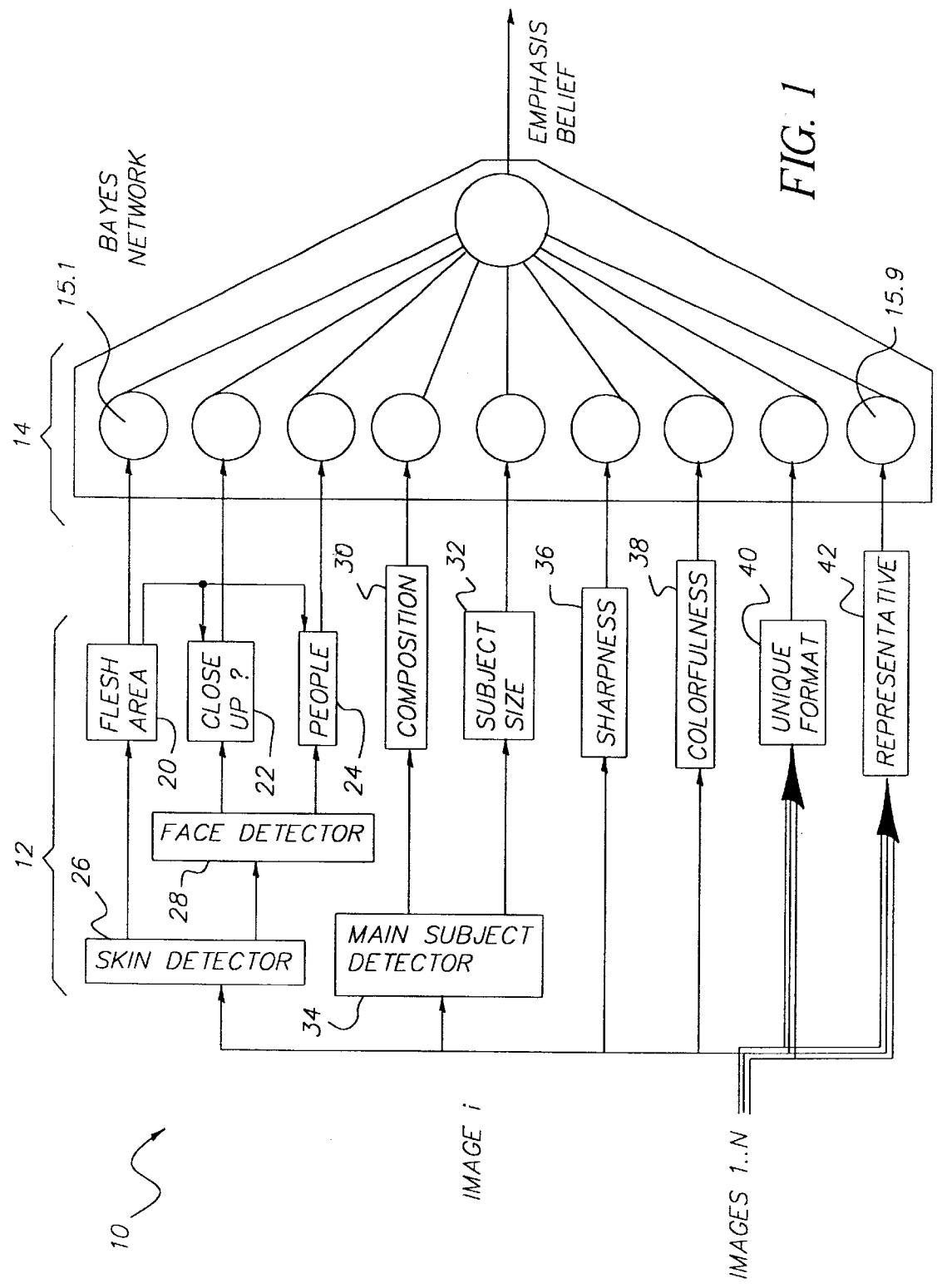
FIG. 1 is a block diagram of a network for calculating an emphasis value for an image.

The image assessment network 10 shown in FIG. 12 is described in more detail in FIGS. 1 through 10, which are adapted from co-pending, commonly-assigned U.S. Ser. No. 09/460,759, filed Dec. 14, 1999 in the names of Andreas E. Savakis and Stephen Etz and entitled "Method for Automatic Assessment of Emphasis and Appeal in Consumer Images", and which is incorporated herein by reference. Referring first to FIG. 1, an image assessment network 10 for computing an emphasis value is shown to comprise two stages: a feature extraction stage 12 and a classification stage 14. The feature extraction stage 12 employs a number of algorithms, each designed to measure some image feature characteristic, where a quantitative measure of the feature is expressed by the value of the output of the algorithm. The outputs of the feature extraction stage 12 thus represent statistical evidence of the presence (or absence) of certain features; the outputs are then integrated by the classification stage 14 to compute an emphasis value. This value may, e.g., range from 0 to 100 and indicates the likelihood or belief that the processed image is the emphasis image. After the emphasis values have been computed for a group of images in separate image emphasis networks 10.1, 10.2 . . . 10.N, as shown in FIG. 4, the emphasis values are compared in a comparator stage 16 and normalized in respective normalization stages 16.1, 16.2 . . . 16.N. The image with the highest emphasis value is chosen as the emphasis image for the group.

Figure 3:
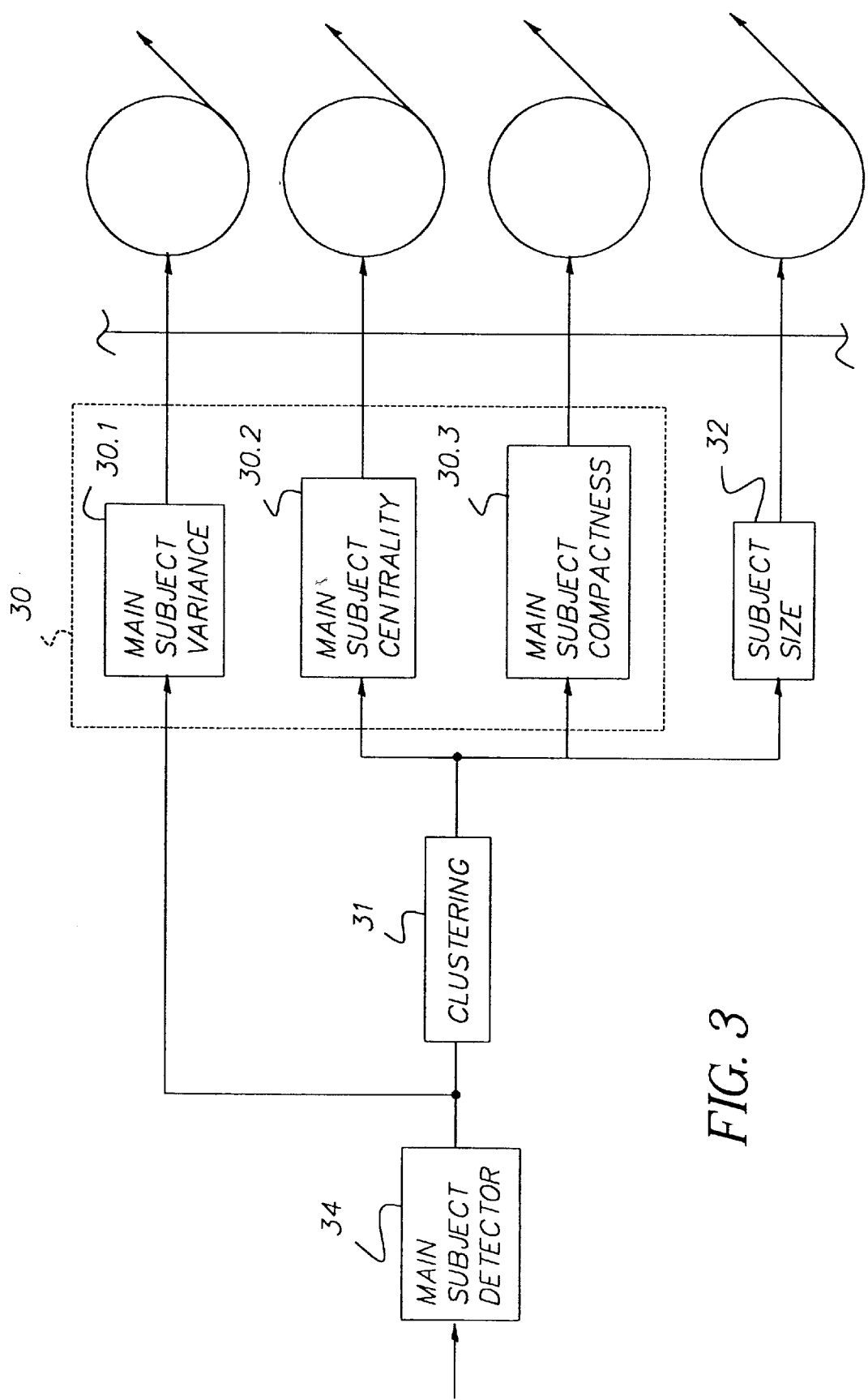
FIG. 3 is a block diagram showing in more detail the components of main subject detection as shown in FIGS. 1 and 2.

An ensemble of features was selected for the feature extraction stage 12 on the basis of ground truth studies of the preference of human observers. The ground truth studies showed that the features that are important for emphasis image selection are not strongly related to traditional image quality metrics, such as sharpness, contrast, film grain and exposure, although one or more of these traditional metrics may continue to have value in the calculation of an assessment value. The selected features may be generally divided into three categories: (a) features related to people, (b) features related to the main subject, and (c) features related to objective measures of the image. Referring to FIG. 1, features related to people are extracted by a skin area detector 20, a close-up detector 22 and a people detector 24. The input image i is typically processed through a skin detector 26 and a face detector 28 to generate intermediate values suitable for processing by the people-related feature detectors 20, 22 and 24. The features related to the main subject are extracted by a composition detector 30 and a subject size detector 32, based on input from a main subject detector 34. The composition detector 30 is composed of several composition-related main subject algorithms, as shown in FIG. 3, including a main subject variance algorithm 30.1, a main subject centrality algorithm 30.2 and a main subject compactness algorithm 30.3. The main subject data is clustered in a clustering stage 31 and then provided to the composition-related algorithms 30.2 and 30.3 and to the subject size algorithm 32. The features related to objective measures of the image are extracted by a sharpness detector 36, a colorfulness detector 38 and a unique format detector 40. In addition, an objective measure related to how representative the color content of an image is relative to a group of images is extracted by a representative color detector 42.

Figure 2:
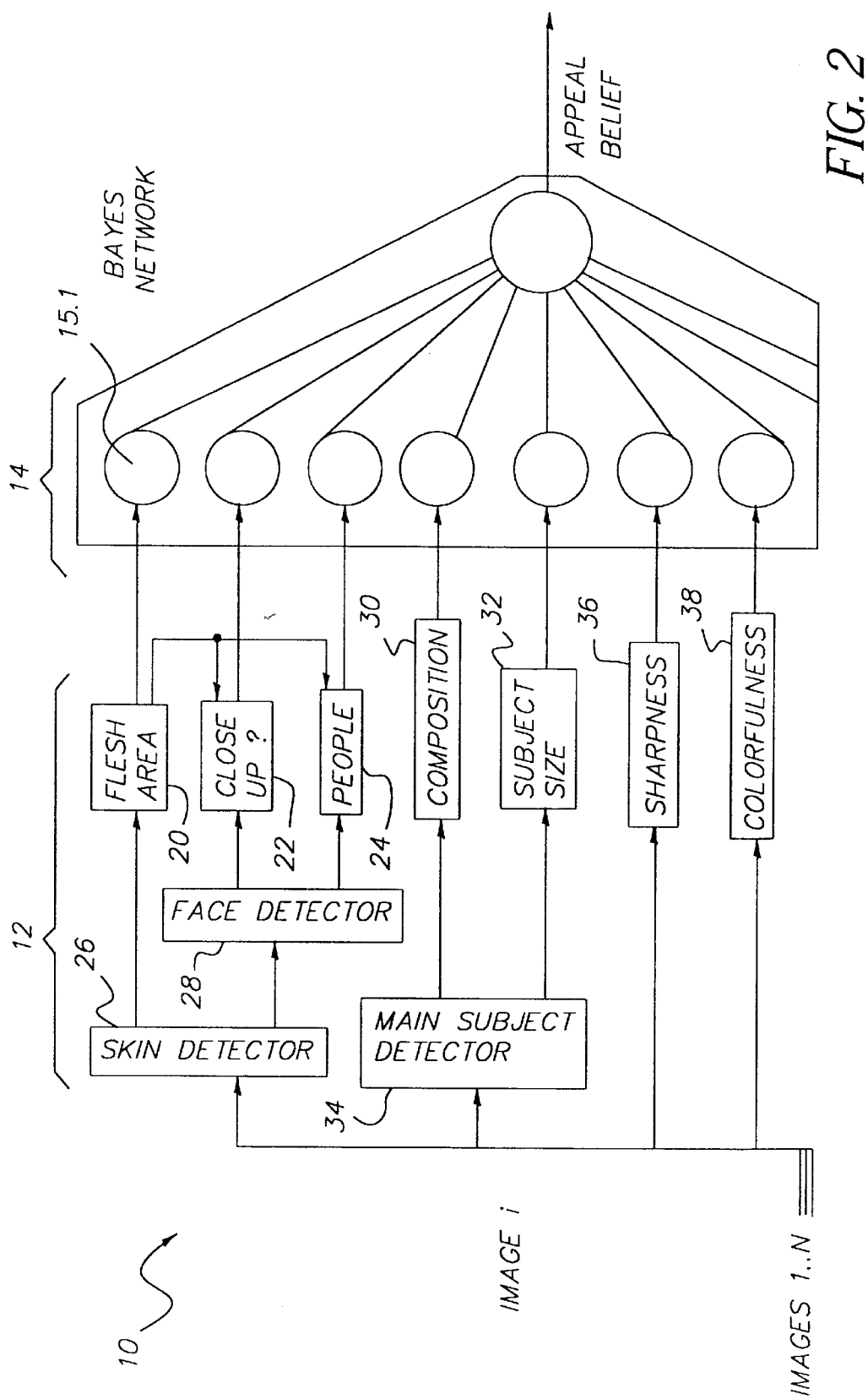
FIG. 2 is a block diagram of a network for calculating an appeal value for an image.

The feature ensemble shown in FIG. 1 is used to calculate a value representative of image emphasis, which is defined as the degree of relative importance, interest or attractiveness of an image with respect to other images in a group. Since each image must be evaluated in relation to other images in a group, the image emphasis calculation thus embodies a network of image emphasis networks 10.1, 10.2 . . . 10.N, such as shown in FIG. 4, which scores the images as to their respective emphasis values. In practice, there may be but one image assessment network 10, which is repeatedly engaged to determine the image emphasis value of a series of images; in this case, the sequentially obtained results could be stored in an intermediate storage (not shown) for input to the comparator 16. The feature ensemble shown in FIG. 2, which is a subset of the feature ensemble shown in FIG. 1, is used to calculate a value representative of image appeal, which is defined as the intrinsic degree of importance, interest or attractiveness of an image in an absolute sense, that is, without reference to other images. The features shown in FIG. 2 are thus referred to as self-salient features, inasmuch as these features can stand on their own as an assessment of an image. In comparison, two additional features are detected in FIG. 1, namely, the unique format feature and the representative color feature; these are referred to as relative-salient features, inasmuch as these features are measurements that necessarily relate to other images. (These features, however, are optional insofar as a satisfactory measure of emphasis can be obtained from the self-salient features alone.) Consequently, an assessment of both appeal and emphasis involve self-salient features, while only an assessment of emphasis may involve relative-salient features.

The extraction of the feature ensembles according to FIGS. 1 and 2 involves the computation of corresponding feature quantities, as set forth below.

Objective Features

Objective features are the easiest to compute and provide the most consistent results in comparison to other types of features. Methods for computing them have been available for some time, and a large art of imaging science is based on such measures. Although a large number of objective features could potentially be computed, only colorfulness and sharpness are considered for purposes of both image emphasis and appeal (FIGS. 1 and 2), and additionally unique format and representative color for purposes of image emphasis (FIG. 1). Other objective measures, such as contrast and noise, may be found useful in certain situations and are intended to be included within the coverage of this invention.

Colorfulness

Figure 6:
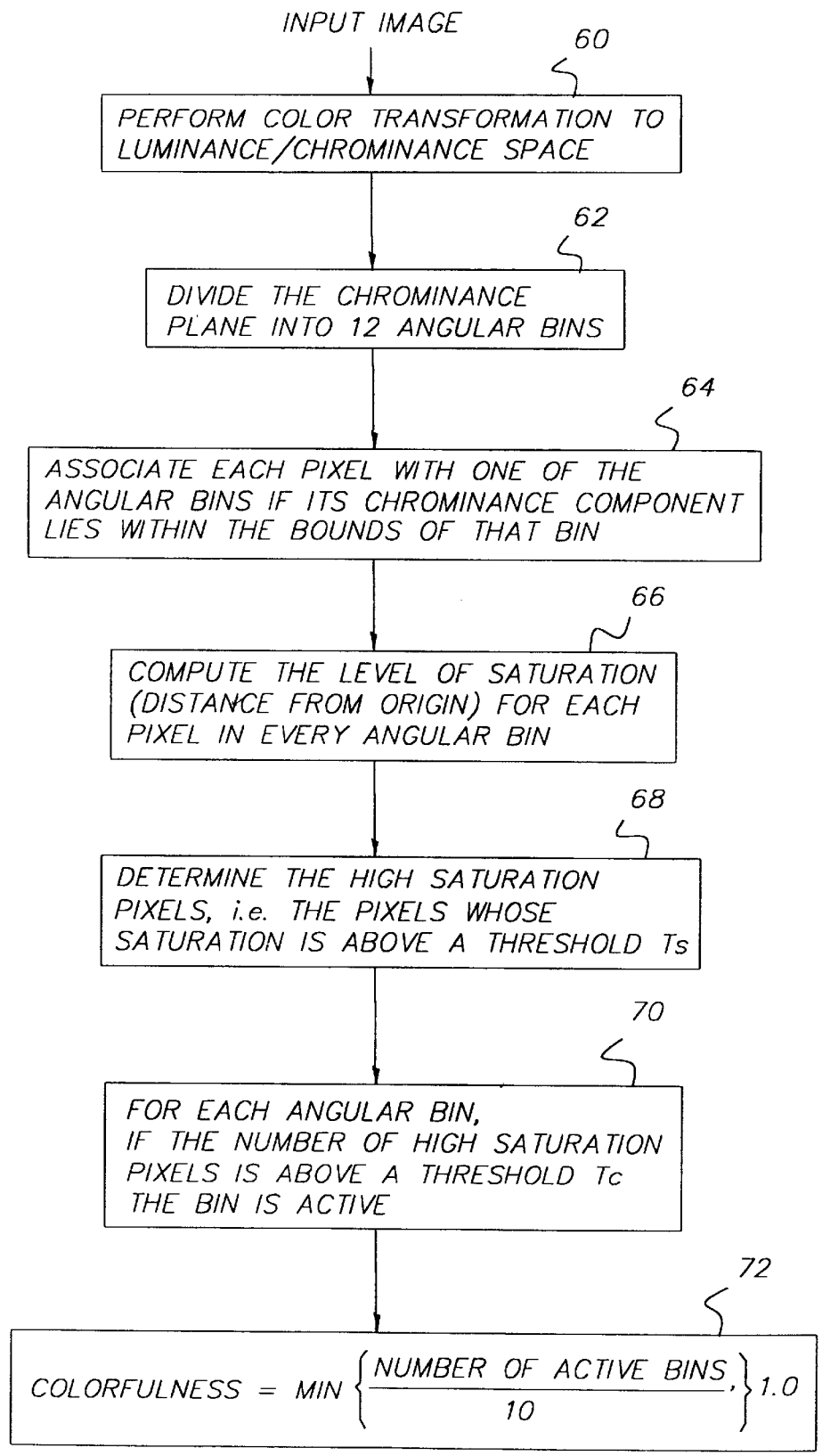
FIG. 6 is a detailed diagram of a method for determining the colorfulness of an image.
Figure 7:
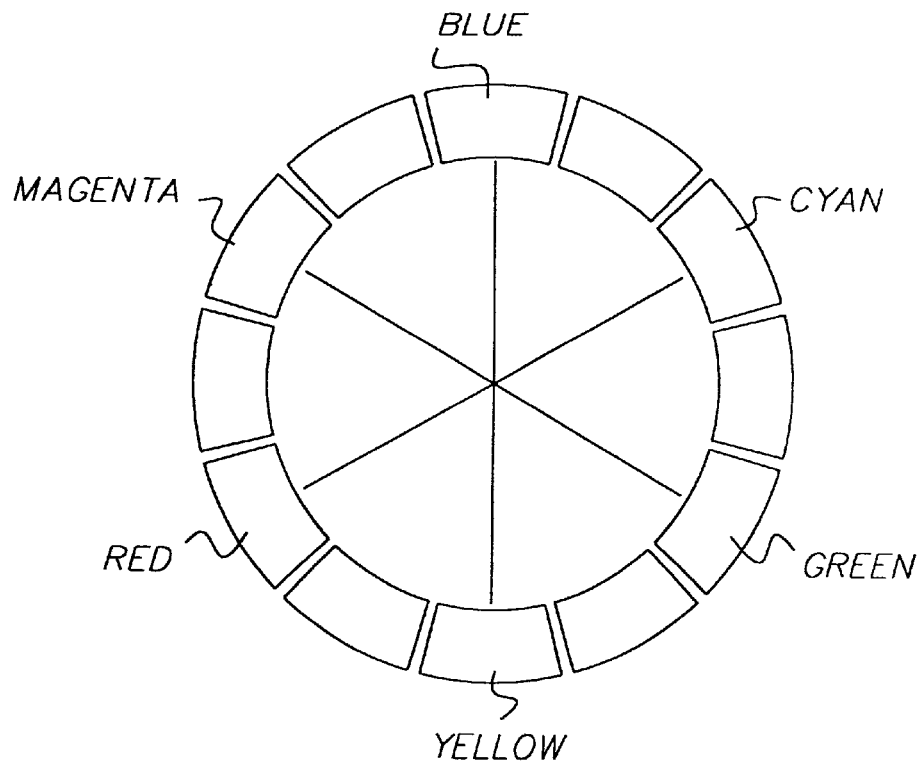
FIG. 7 is a diagram of chromaticity plane wedges that are used for the colorfulness feature computation.

The colorfulness detector 38 provides a quantitative measure of colorfulness based on the observation that colorful pictures have colors that display high saturation at various hues. This was determined in ground truth studies by examining for the presence of high saturation colors along various hues. The assumption of sRGB color space was made with respect to the image data. In particular, and as shown in FIG. 6, the colorfulness detector 38 implements the following steps for computing colorfulness. Initially, in step 60, the input image values i are transformed to a luminance/chrominance space. While many such transformations are known to the skilled person and may be used with success in connection with the invention, the preferred transformation is performed according to the following expressions:

$$\text{Neutral} = \left(\frac{R+G+B}{3}\right)$$

$$\text{Green-Magenta} = \left(\frac{2G-R-B}{4}\right)$$

$$\text{Illumination} = \left(\frac{B-R}{2}\right)$$

where neutral is a measure of luminance, and green-magenta and illumination are a measure of chrominance. In step 62, the chrominance plane (illumination, green-magenta) is divided and quantized into twelve chromaticity plane wedges, as shown in FIG. 7, which are referred to as angular bins. Next, in step 64, each pixel is associated with one of the angular bins if its chrominance component lies within the bounds of that bin. The level of saturation (which is the distance from origin) is calculated in step 66 for each pixel in each angular bin. The number of high saturation pixels that populate each angular bin are then measured in step 68, where a high saturation pixel is one whose distance from the origin in the chrominance plane is above a certain threshold $T_s$ (e.g., $T_s$=0.33). For each angular bin, the bin is determined to be active in step 70 if the number of high saturation pixels exceeds a certain threshold $T_c$(e.g., $T_c$=250 pixels). Colorfulness is then calculated in step 72 according to the following expression:

$$\text{Colorfulness} = \min\left\{\frac{\text{Number of active bins}}{10}, 1.0\right\}$$

Note that this definition of colorfulness assumes that if 10 out of the 12 bins are populated, colorfulness is considered to be 1.0 and the image is most colorful.

Sharpness

The sharpness detector 36 implements the following steps to find sharpness features in the image:

a) The image is cropped at a 20% level along the border and converted to grayscale by extracting the green channel;

b) The image edges are detected in the green channel using a Sobel operator after running a 3×3 averaging filter to reduce noise;

c) An edge histogram is formed and the regions that contain the strongest edges are identified as those that are above the $90^{th}$ percentile of the edge histogram;

d) The strongest-edge regions are refined through median filtering, and the statistics of the strongest edges are computed; and e) The average of the strongest edges provides an estimate of sharpness. Further details of the method employed for sharpness detection may be found in commonly assigned U.S. Pat. No. 6,535,636, entitled "A Method for Automatically Detecting Digital Images that are Undesirable for Placing in Albums", issued Aug. 18, 2003 in the names of Andreas Savakis and Alexander Loui, and which is incorporated herein by reference.

Format Uniqueness

Participants in the ground truth experiment indicated that pictures taken in APS "panoramic" mode are more deserving of emphasis. Preliminary analysis of the ground truth data indicated that if a picture was the only panoramic picture in a group, this fact increases its likelihood of being selected as the emphasis image. The relative feature "format uniqueness" represents this property.

The unique format detector 40 implements the following algorithm for each image i in the group, in which the format f is based on the long and short pixel dimensions $l_i$, $s_i$, of the image:

$$f_i \equiv \begin{cases} C, & l_i/s_i < 1.625, \\ H, & 1.625 \le l_i/s_i < 2.25, \\ P, & 2.25 \le l_i/s_i. \end{cases}$$

Then format uniqueness U is $$Ui = \begin{cases} 1, & f_i \ne f_j, \forall i \ne j, \\ 0, & \text{otherwise.} \end{cases}$$

Representative Color

The representative color detector 42 implements the following steps to determine how representative the color of an image is:

1. For each image i, compute the color histogram $h_i(R, G,B)$ (in RGB or Luminance/Chrominance space)

2. Find the average color histogram for the group by averaging all of the image histograms as follows:

$$A_h(R, G, B) = \sum_{i=1}^{N} h_i(R, G, B)$$

3. For each image i, compute the distance between the histogram of the image and the average color histogram (Euclidian or Histogram intersection distance), as follows:

$$d_i(R, G, B) = \frac{1}{2}\sum_{i=1}^{N} |h_i(R, G, B) - A_h(R, G, B)|$$

4. Find the maximum of the distances computed in 3, as follows:.

$$d_{max}(R, G, B) = \max_{i=1...N} \{d_i(R, G, B)\}$$

5. The representative measure r is obtained by dividing each of the distances with the maximum distance (can vary from 0 to 1), as follows:

$$r_i(R, G, B) = \frac{d_i(R, G, B)}{d_{max}(R, G, B)}$$

People-Related Features

People related features are important in determining image emphasis, but many of the positive attributes that are related to people are difficult to compute, e.g. people smiling, people facing camera, etc. Skin detection methods allow the computation of some people-related features such as: whether people are present, the magnitude of the skin area, and the amount of closeup.

Skin and Face Detection

The skin detection method that is used by the skin detector 26, and the face detection method that is used by the face detector 28, is based on the method disclosed in commonly assigned patent application Ser. No. 09/112,661 (now abandoned) entitled "A Method for Detecting Human Faces in Digitized Images" which was filed Jul. 9, 1998 in the names of H. C. Lee and H. Nicponski., and which is incorporated herein by reference.

Figure 8:
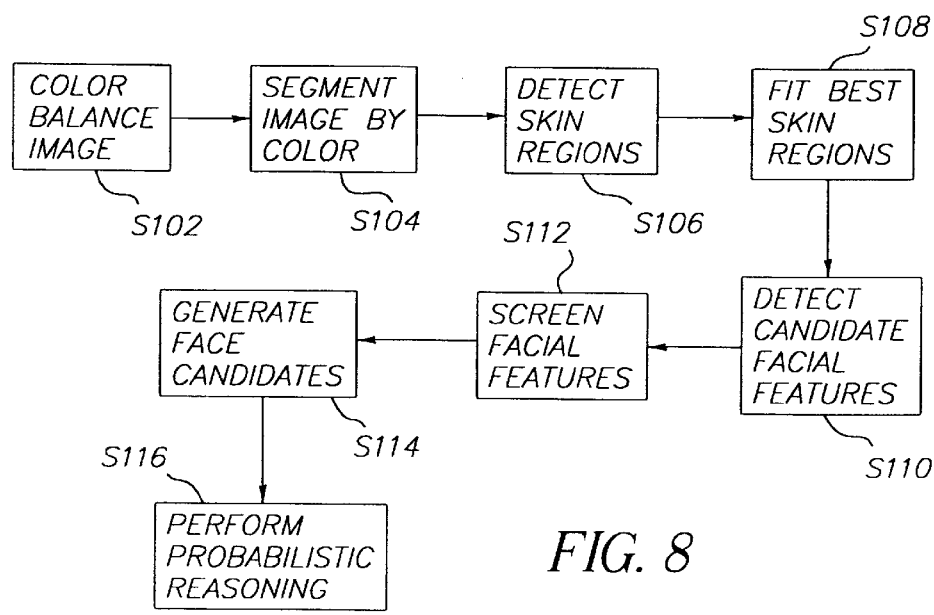
FIG. 8 is a block diagram of a method for skin and face detection.

Referring to FIG. 8, an overview is shown of the method disclosed in Ser. No. 09/112,661. The input images are color balanced to compensate for predominant global illumination in step S102, which involves conversion from (r,g,b) values to (L,s,t) values. In the (L,s,t) space, the L axis represents the brightness of a color, while the s and t axes are chromatic axes. The s component approximately represents the illuminant variations from daylight to tungsten light, from blue to red. The t component represents an axis between green and magenta. A number of well-known color balancing algorithms may be used for this step, including a simple method of averaging-to-gray. Next, a k-mode clustering algorithm is used for color segmentation in step S104. A disclosure of this algorithm is contained in commonly assigned U.S. Pat. No. 5,418,895, which is incorporated herein by reference. Basically, a 3-D color histogram in (L,s,t) space is formed from the input color image and processed by the clustering algorithm. The result of this step is a region map with each connected region having a unique label. For each region, the averaged luminance and chromaticity are computed in step S106. These features are used to predict possible skin regions (candidate skin regions) based on conditional probability and adaptive thresholding. Estimates of the scale and in-plane rotational pose of each skin region are then made by fitting a best ellipse to each skin region in step S108. Using a range of scales and in-plane rotational pose around these estimates, a series of linear filtering steps are applied to each facial region in step S110 for identifying tentative facial features. A number of probability metrics are used in step S112 to predict the likelihood that the region actually represents a facial feature and the type of feature it represents.

Features that pass the previous screening step are used as initial features in a step S114 for a proposed face. Using projective geometry, the identification of the three initial features defines the possible range of poses of the head. Each possible potential face pose, in conjunction with a generic three-dimensional head model and ranges of variation of the position of the facial features, can be used to predict the location of the remaining facial features. The list of candidate facial features can then be searched to see if the predicted features were located. The proximity of a candidate feature to its predicted location and orientation affects the probabilistic estimate of the validity of that feature.

A Bayesian network probabilistic model of the head is used in a step S116 to interpret the accumulated evidence of the presence of a face. The prior probabilities of the network are extracted from a large set of training images with heads in various orientations and scales. The network is initiated with the proposed features of the candidate face, with their estimated probabilities based on computed metrics and spatial conformity to the template. The network is then executed with these initial conditions until it converges to a global estimate of the probability of face presence. This probability can be compared against a hard threshold or left in probabilistic form when a binary assessment is not needed. Further details of this skin and face detection method may be found in Ser. No. 09/112,661, which is incorporated herein by reference.

Skin Area

The percentage of skin/face area in a picture is computed by the skin area detector 20 on its own merit, and also as a preliminary step to people detection and close-up detection. Consequently, the output of the skin area detector 20 is connected to the classification stage 14 and also input to the close-up detector 22 and the people detector 24. Skin area is a continuous variable between 0 and 1 and correlates to a number of features related to people. For example, for pictures taken from the same distance, increasing skin area indicates that there are more people in the picture and correlates with the positive indicator of "whole group in photo." Alternatively, if two pictures contain the same number of people, larger skin area may indicate larger magnification, which correlates with the positive attribute of "closeup." Other explanations for larger skin area are also possible due to subject positioning.

Close-up

The close-up detector 22 employs the following measure for determining close-up:

a) skin detection is performed and the resulting map is examined at the central region (25% from border); and b) close-up is determined as the percentage of skin area at the central portion of the image.

In some cases, face detection would be more appropriate than skin detection for determining close-up.

People Present

The presence of people is detected by the people detector 24 when a significant amount of skin area is present in the image. The percentage of skin pixels in the image is computed and people are assumed present when the skin percentage is above a threshold $T_f$ number of pixels (e.g., $T_f$=20 pixels). People present is a binary feature indicating the presence or absence of people for 1 or 0 respectively.

Composition Features

Good composition is a very important positive attribute of picture emphasis and bad composition is the most commonly mentioned negative attribute. Automatic evaluation of the composition of an image is very difficult and sometimes subjective. Good composition may follow a number of general well-known rules, such as the rule of thirds, but these rules are often violated to express the photographer's perspective.

Main Subject Detection

Figure 9:
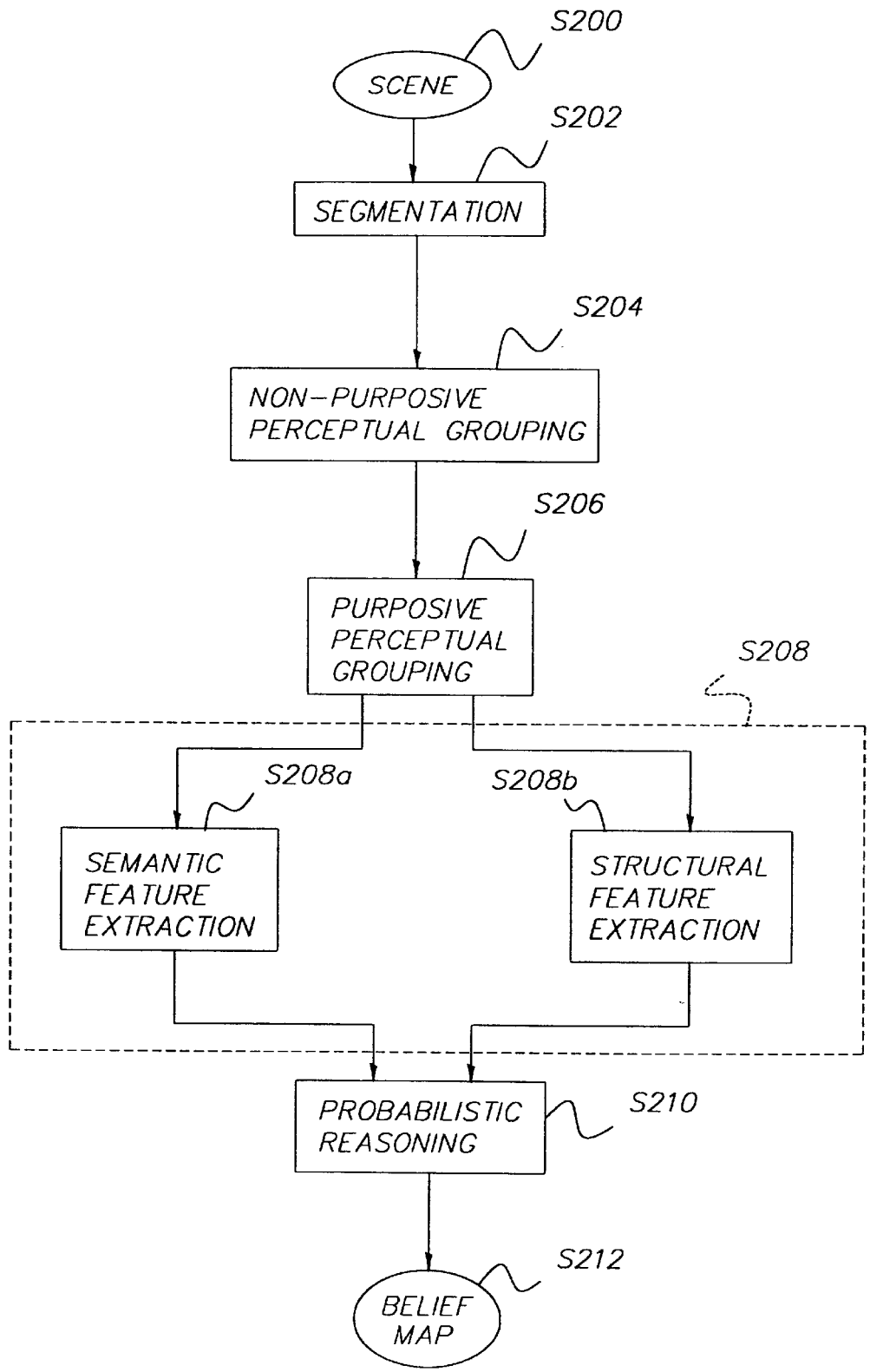
FIG. 9 is a detailed block diagram of main subject detection as shown in FIG. 5.

The algorithm used by the main subject detector 34 is disclosed in commonly assigned U.S. Pat. No. 6,282,317 entitled "Method for Automatic Determination of Main Subjects in Consumer Images", issued Aug. 28, 2001 in the names of J. Luo, S. Etz and A. Singhal. Referring to FIG. 9, there is shown a block diagram of an overview of the main subject detection method disclosed in U.S. Pat. No. 6,282,317. First, an input image of a natural scene is acquired and stored in step S200 in a digital form. Then, the image is segmented in step S202 into a few regions of homogeneous properties. Next, the region segments are grouped into larger regions in step S204 based on similarity measures through non-purposive perceptual grouping, and further grouped in step S206 into larger regions corresponding to perceptually coherent objects through purposive grouping (purposive grouping concerns specific objects). The regions are evaluated in step S208 for their saliency using two independent yet complementary types of saliency features—structural saliency features and semantic saliency features. The structural saliency features, including a set of low-level early vision features and a set of geometric features, are extracted in step S208a, which are further processed to generate a set of self-saliency features and a set of relative saliency features. Semantic saliency features in the forms of key subject matters, which are likely to be part of either foreground (for example, people) or background (for example, sky, grass), are detected in step S208b to provide semantic cues as well as scene context cues. The evidences of both types are integrated in step S210 using a reasoning engine based on a Bayes net to yield the final belief map step S212 of the main subject.

To the end of semantic interpretation of images, a single criterion is clearly insufficient. The human brain, furnished with its a priori knowledge and enormous memory of real world subjects and scenarios, combines different subjective criteria in order to give an assessment of the interesting or primary subject(s) in a scene. The following extensive list of features are believed to have influences on the human brain in performing such a somewhat intangible task as main subject detection: location, size, brightness, colorfulness, texturefulness, key subject matter, shape, symmetry, spatial relationship (surroundedness/occlusion), borderness, indoor/outdoor, orientation, depth (when applicable), and motion (when applicable for video sequence).

The low-level early vision features include color, brightness, and texture. The geometric features include location (centrality), spatial relationship (borderness, adjacency, surroundedness, and occlusion), size, shape, and symmetry. The semantic features include skin, face, sky, grass, and other green vegetation. Those skilled in the art can define more features without departing from the scope of the present invention. More details of the main subject detection algorithm are provided in U.S. Pat. No. 6,282,317, which is incorporated herein by reference.

The aforementioned version of the main subject detection algorithm is computationally intensive and alternative versions may be used that base subject detection on a smaller set of subject-related features. Since all of the composition measures considered here are with respect to the main subject belief map, it is feasible to concentrate the system on the most computationally effective aspects of these measures, such as aspects bearing mostly on the "centrality" measure. These aspects are considered in judging the main subject, thereby reducing the overall computational complexity at the expense of some accuracy. It is a useful property of the Bayesian Network used in the main subject detection algorithm that features can be excluded in this way without requiring the algorithm to be retrained. Secondly, it takes advantage of the fact that images supplied to main subject detector 50 are known to be oriented right-side-up. The subject-related features associated with spatial location of a region within the scene can be modified to reflect this knowledge. For example, without knowing scene orientation the main subject detector 50 assumes a center-weighted distribution of main subject regions, but with known orientation a bottom-center-weighted distribution may be assumed.

Referring to FIG. 3, after the main subject belief map has been computed in the main subject detector 50, it is segmented in a clustering stage 31 into three regions using k-means clustering of the intensity values. The three regions correspond to pixels that have high probability of being part of the main subject, pixels that have low probability of being part of the main subject, and intermediate pixels. Based on the quantized map, the features of main subject size, centrality, compactness, and interest (variance) are computed as described below in reference to FIGS. 5A–5D.

Main Subject Variance

One way to characterize the contents of a photograph is by how interesting it is. For the purpose of emphasis image selection, an image with the following characteristics might be considered interesting.

the main subject is interesting in and of itself, by virtue of its placement in the frame.

the main subject constitutes a reasonably large area of the picture, but not the entire frame.

the background does not include isolated objects that can distract from the main subject.

Figure 5A:
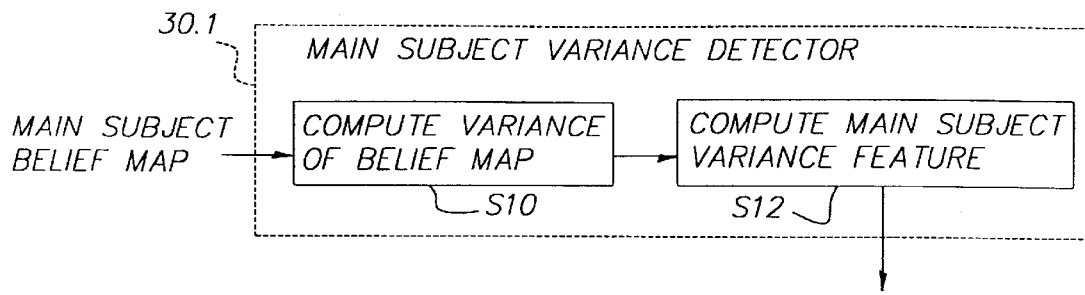
FIGS. 5A–5D are detailed diagrams of the component methods shown in FIG. 3 for main subject detection.

An estimate of the interest level of each image is computed by estimating the variance in the main subject map. This feature is primarily valuable as a counterindicator: that is, uninteresting images should not be the emphasis image. In particular, and as shown in FIG. 5A, the main subject variance detector 30.1 implements the following steps for computing main subject variance. Initially, in step S10, the statistical variance v of all main subject belief map values is computed. In step S12, the main subject variance feature y is computed according to the formula:

$$y = \min(1, 2.5 * \mathrm{sqrt}(v)/127.5)$$

Main Subject Centrality

Figure 5C:
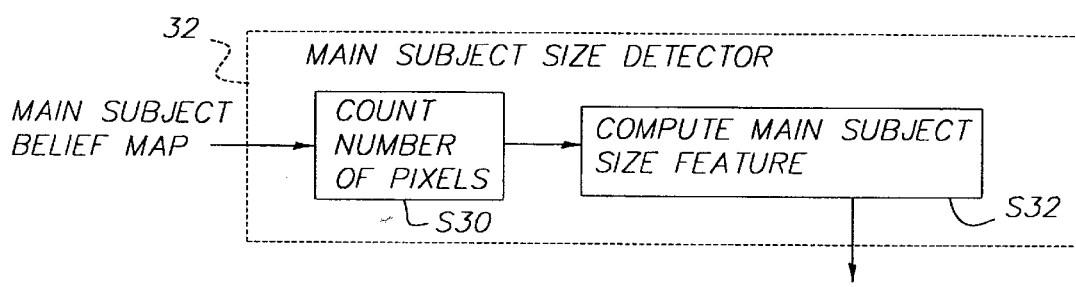
Figures 5B, 5D:
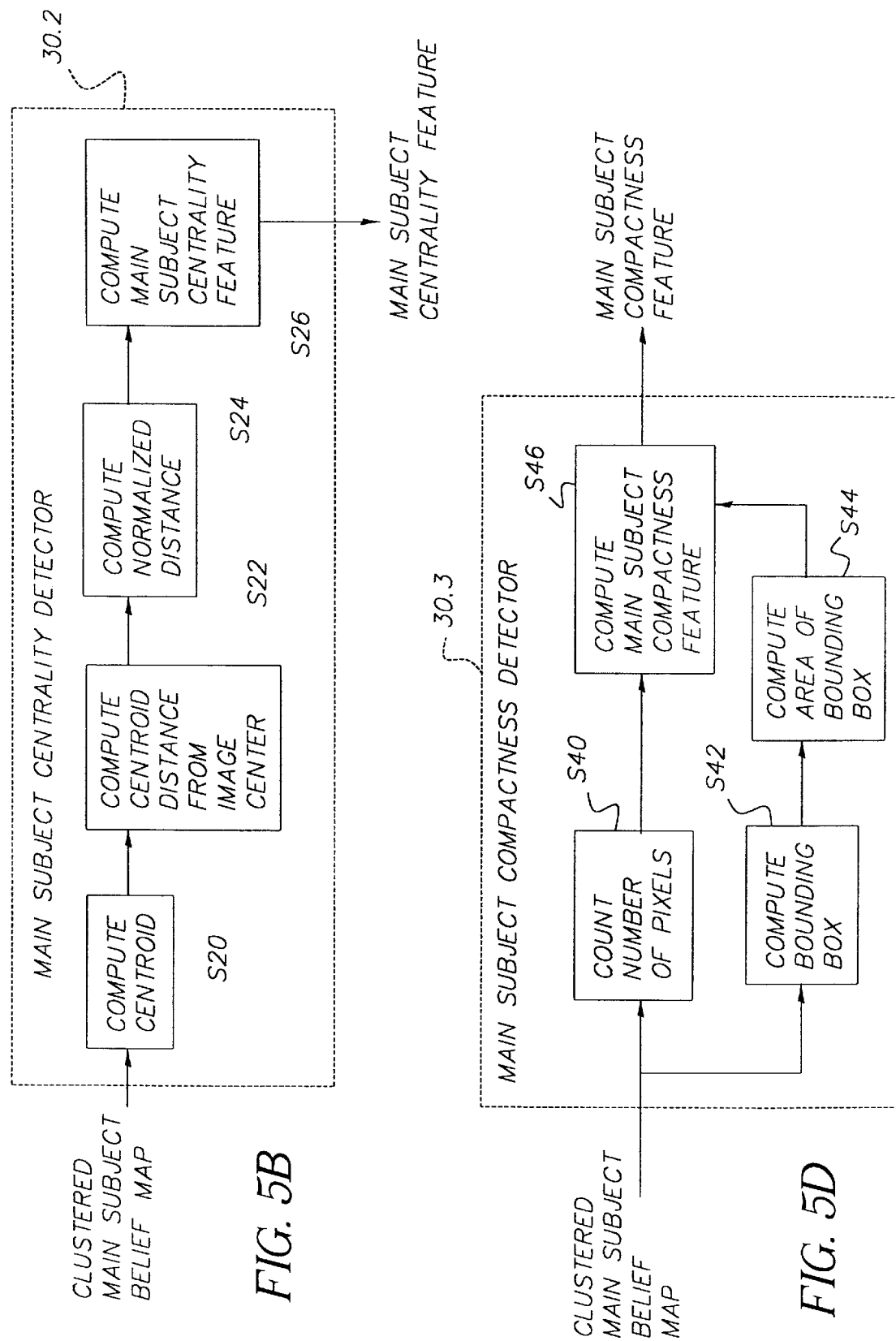

The main subject centrality is computed as the distance between the image center and the centroid of the high probability (and optionally the intermediate probability) region(s) in the quantized main subject belief map. In particular, and as shown in FIG. 5B, the main subject centrality detector 30.2 implements the following steps for computing main subject centrality. Initially, in step S20, the pixel coordinates of the centroid of the highest-valued cluster is located. In step S22, the Euclidean distance j from the center of the image to the centroid is computed. In step S24, the normalized distance k is computed by dividing j by the number of pixels along the shortest side of the image. In step S26, the main subject centrality feature m is computed according to the formula:

$$m = \min(k, 1)$$

Main Subject Size

The size of the main subject is determined by the size of the high probability (and optionally the intermediate probability) region(s) in the quantized main subject belief map. It is expressed as the percentage of the central area (25% from border) that is occupied by the high (and optionally the intermediate) probability region. In particular, and as shown in FIG. 5C, the main subject size detector 32 implements the following steps for computing main subject size. Initially, in step S30, the number of pixels f in the intersection of the highest-valued cluster and the rectangular central ¼ of the image area is counted. In step S32, the main subject size feature g is computed according to the formula:

$$g=f/N$$

where N is the total number of image pixels.

Main Subject Compactness

The compactness of the main subject is estimated by computing a bounding rectangle for the high probability (and optionally the intermediate probability) region(s) in the quantized main subject belief map, and then examining the percentage of the bounding rectangle that is occupied by the main subject. In particular, and as shown in FIG. 5D, the main subject compactness detector 30.3 implements the following steps for computing main subject compactness. Initially, in step S40, the number of pixels a in the highest-valued cluster is counted. In step S42, the smallest rectangular box which contains all pixels in the highest-valued cluster (the bounding box) is computed, and in step S44 the area b of the bounding box, in pixels, is calculated. In step S46, the main subject compactness feature e is determined according to the formula:

$$e=\min(1, \max(0, 2*(a/b-0.2)))$$

where e will be a value between 0 and 1, inclusive.

Classification Stage

The feature quantities generated according to the algorithms set forth above are applied to the classification stage 14, which is preferably a reasoning engine that accepts as input the self-salient and/or the relative-salient features and is trained to generate image assessment (emphasis and appeal) values. Different evidences may compete or reinforce each according to knowledge derived from the results of the ground truth study of human observers—evaluations of real images. Competition and reinforcement are resolved by the inference network of the reasoning engine. A preferred reasoning engine is a Bayes network.

A Bayes net (see, e.g., J. Pearl, *Probabilistic Reasoning in Intelligent Systems*, San Francisco, Calif.: Morgan Kaufmann, 1988) is a directed acyclic graph that represents causality relationships between various entities in the graph, where the direction of links represents causality relationships between various entities in the graph, and where the direction of links represents causality. Evaluation is based on knowledge of the Joint Probability Distribution Function (PDF) among various entities. The Bayes net advantages include explicit uncertainty characterization, efficient computation, easy construction and maintenance, quick training, and fast adaptation to changes in the network structure and its parameters. A Bayes net consists of four components:

Priors: The initial beliefs about various nodes in the Bayes net.

Conditional Probability Matrices (CPMs): Expert knowledge about the relationship between two connected nodes in the Bayes net.

Evidences: Observations from feature detectors that are input to the Bayes net.

Posteriors: The final computed beliefs after the evidences have been propagated through the Bayes net.

The most important component for training is the set of CPMs, shown as CPM stages 15.1 ... 15.9 in FIG. 1 (and 15.1 ... 15.7 in FIG. 2) because they represent domain knowledge for the particular application at hand. While the derivation of CPMs is familiar to a person skilled in using reasoning engines such as a Bayes net, the derivation of an exemplary CPM will be considered later in this description.

Referring to FIGS. 1 and 2, a simple two-level Bayes net is used in the current system, where the emphasis (or appeal) score is determined at the root node and all the feature detectors are at the leaf nodes. It should be noted that each link is assumed to be conditionally independent of other links at the same level, which results in convenient training of the entire net by training each link separately, i.e., deriving the CPM for a given link independent of others. This assumption is often violated in practice; however, the independence simplification makes implementation feasible and produces reasonable results. It also provides a baseline for comparison with other classifiers or reasoning engines.

Probabilistic Reasoning

All the features are integrated by a Bayes net to yield the emphasis or appeal value. On one hand, different evidences may compete with or contradict each other. On the other hand, different evidences may mutually reinforce each other according to prior models or knowledge of typical photographic scenes. Both competition and reinforcement are resolved by the Bayes net-based inference engine.

Figure 10:
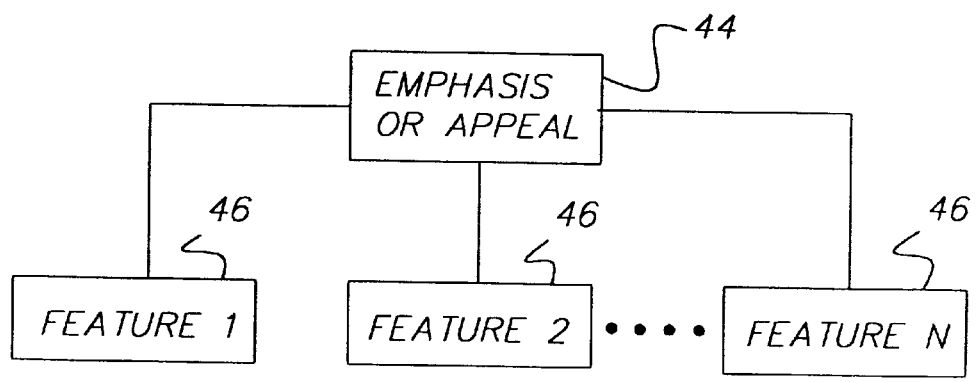
FIG. 10 is a diagram of a two level Bayesian net used in the networks shown in FIGS. 1 and 2.

Referring to FIG. 10, a two-level Bayesian net is used in the present invention that assumes conditional independence between various feature detectors. The emphasis or appeal value is determined at the root node 44 and all the feature detectors are at the leaf nodes 46. There is one Bayes net active for each image. It is to be understood that the present invention can be used with a Bayes net that has more than two levels without departing from the scope of the present invention.

Training Bayes Nets

One advantage of Bayes nets is each link is assumed to be independent of links at the same level. Therefore, it is convenient for training the entire net by training each link separately, i.e., deriving the CPM 15.1 ... 15.9 for a given link independent of others. In general, two methods are used for obtaining CPM for each root-feature node pair:

1. Using Expert Knowledge

This is an ad-hoc method. An expert is consulted to obtain the conditional probabilities of each feature detector producing a high or low output given a highly appealing image.

2. Using Contingency Tables

This is a sampling and correlation method. Multiple observations of each feature detector are recorded along with information about the emphasis or appeal. These observations are then compiled together to create contingency tables which, when normalized, can then be used as the CPM 15.1 ... 15.9. This method is similar to neural network type of training (learning). This method is preferred in the present invention.

Consider the CPM for an arbitrary feature as an example. This matrix was generated using contingency tables derived from the ground truth and the feature detector. Since the feature detector in general does not supply a binary decision (referring to Table 1), fractional frequency count is used in deriving the CPM. The entries in the CPM are determined by $$CPM = \left[\left(\sum_{i \in I}\sum_{r \in R_i} n_i F_r^T T_r\right) P\right]^T \quad (14)$$

$$F_r = [f_0^r f_1^r \ldots f_M^r], \quad T_r = [t_0^r t_1^r \ldots t_L^r],$$

$$P = diag\{p_j\}, \quad p_j = \left(\sum_{i \in I}\sum_{r \in R_i} n_i t_r\right),$$

where I is the set of all training image groups, $R_i$ is the set of all images in group i, $n_i$ is the number of observations (observers) for group i. Moreover, $F_r$ represents an M-label feature vector for image r, $T_r$ represents an L-level ground-truth vector, and P denotes an L×L diagonal matrix of normalization constant factors. For example, in Table 1, images 1, 4, 5 and 7 contribute to boxes 00, 11, 10 and 01 in Table 2, respectively. Note that all the belief values have been normalized by the proper belief sensors. As an intuitive interpretation of the first column of the CPM for centrality, an image with a high feature value is about twice as likely to be highly appealing than not.

TABLE 1

An example of training the CPM.

| Image Number | Ground Truth | Feature Detector Output | Contribution |
|---|---|---|---|
| 1 | 0 | 0.017 | 00 |
| 2 | 0 | 0.211 | 00 |
| 3 | 0 | 0.011 | 00 |
| 4 | 0.933 | 0.953 | 11 |
| 5 | 0 | 0.673 | 10 |
| 6 | 1 | 0.891 | 11 |
| 7 | 0.93 | 0.072 | 01 |
| 8 | 1 | 0.091 | 01 |

TABLE 2

The trained CPM.

|  | Feature = 1 | feature = 0 |
|---|---|---|
| Emphasis or Appeal = 1 | 0.35 (11) | 0.65 (01) |
| Emphasis or Appeal = 0 | 0.17 (10) | 0.83 (00) |

While the invention has been described for use with a Bayes net, different reasoning engines may be employed in place of the Bayes net. For example, in *Pattern Recognition and Neural Networks* by B. D. Ripley (Cambridge University Press, 1996), a variety of different classifiers are described that can be used to solve pattern recognition problems, where having the right feature is normally the most important consideration. Such classifiers include linear discriminant analysis methods, flexible discriminants, (feed-forward) neural networks, non-parametric methods, tree-structured classifiers, and belief networks (such as Bayesian networks). It will be obvious to anyone of ordinary skill in such methods that any of these classifiers can be adopted as the reasoning engine for practice of the present invention.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention.

PARTS LIST 10 image assessment network
12 feature extraction stage
14 classification stage
16 comparator stage
18 normalization stage
20 skin area detector
22 close-up detector
24 people detector
26 skin detector
28 face detector
30 composition detector
30.1 main subject variance algorithm
30.2 main subject centrality algorithm
30.3 main subject compactness algorithm
31 clustering stage
32 subject size detector
34 main subject detector
36 sharpness detector
38 colorfulness detector
40 unique format detector
42 representative color detector
44 root node
46 leaf node
50 main subject detector
52 clustering stage
110 image capture device
120 digital image processor
122 enhancement transform module
130 image output device
140 general control computer
150 monitor device
160 input control device
170 computer memory device
180 processing attribute controller
190 computer system

What is claimed is:

1. A method for varying the image processing path for a digital image, said method comprising the steps of:
   (a) receiving a group of digital images;
   (b) computing an image processing attribute value for each digital image based on a determination of the degree of importance, interest or attractiveness of each digital image relative to other digital images in the group of digital images; and
   (c) using the image processing attribute value to control the image processing path for each digital image such that those digital images with the lowest degree of importance, interest or attractiveness are preferentially processed to raise their processed state of quality nearer to the level of the other digital images within the group of digital images.

2. The method as claimed in claim 1 wherein the image processing attribute value is based on an appeal value determined from the degree of importance, interest or attractiveness that is intrinsic to the image.

3. The method as claimed in claim 1 wherein the image is one of a group of digital images and the image processing attribute value is based on an emphasis value determined from the degree of importance, interest or attractiveness of the image relative to other images in the group of images.

4. The method as claimed in claim 1 wherein the image processing attribute value is used to preferentially allocate the computational resources of the image processing path for the image.

5. The method as claimed in claim 1 wherein the image processing attribute value is used to control at least one of a noise reduction algorithm and a spatial interpolation algorithm.

6. The method as claimed in claim 1 wherein the method for the determination of the degree of importance, interest or attractiveness of the image is based on an assessment of the image with respect to certain features, comprising the further steps of:

(c) computing one or more quantities related to one or more features in the digital image, including one or more features pertaining to the content of the digital image;

(d) processing said one or more quantities with a reasoning algorithm that is trained on the opinions of one or more human observers; and (e) providing an output from the reasoning algorithm that assesses the image.

7. The method as claimed in claim 6 wherein the features pertaining to the content of the digital image include at least one of people-related features and subject-related features.

8. The method as claimed in claim 6 wherein step (c) further includes computing one or more quantities related to one or more objective features pertaining to objective measures of the digital image.

9. The method as claimed in claim 8 wherein the objective features include at least one of colorfulness and sharpness.

10. The method as claimed in claim 6 wherein the reasoning algorithm in step (d) is trained at least in part from ground truth studies of candidate images.

11. The method as claim ed in claim 6 wherein the reasoning algorithm is a Bayesian network.

12. A web-based method useful in a client-server host configuration for varying the image processing path for a digital image, said method comprising the steps of:

(a) establishing a network connection between the client host and the server host;

(b) receiving a group of digital images;

(c) computing an image processing value for each digital image at the client host based on a determination of the degree of importance, interest or attractiveness of each digital image relative to other digital images in the group of digital images; and (d) using the image processing value at the server host to control the image processing path for each digital image such that those digital images with the lowest degree of importance interest or attractiveness are preferentially processed to raise their processed state of quality nearer to the level of the other digital images within the group of digital images.

13. A web-based method useful in a client-server host configuration for varying the image processing path for a digital image, said method comprising the steps of:

(a) establishing a network connection between the client host and the server host;

(b) receiving a group of digital images;

(c) initiating functionality within a web browser at the client host for computing an image processing value for each digital image based on a determination of the degree of importance, interest or attractiveness of each digital image relative to other digital images in the group of digital images; and (d) initiating a web server at the server host for using the image processing value to control the image processing path for each digital image such that those digital images with the lowest degree of importance, interest or attractiveness are preferentially processed to raise their processed state of quality nearer to the level of the other digital images within the group of digital images.

14. The method as claimed in claim 13 wherein the image processing value is an image processing attribute value based on either an emphasis or an appeal value.

15. A computer program product for varying the image processing path for a digital image, said program product comprising: a computer readable storage medium having a computer program stored thereon for performing the steps of:

(a) receiving a group of digital images:

(b) computing an image processing attribute value for each digital image based on a determination of the degree of importance, interest or attractiveness of each digital image relative to other digital images in the group of digital images; and (c) using the image processing attribute value to control the image processing path for each digital image such that those digital images with the lowest degree of importance, interest or attractiveness are preferentially processed to raise their processed state of quality nearer to the level of the other digital images within the group of digital images.

16. The computer program product as claimed in claim 15 wherein the image processing attribute value is based on an appeal value determined from the degree of importance, interest or attractiveness that is intrinsic to the image.

17. The computer program product as claimed in claim 15 wherein the image is one of a group of digital images and the image processing attribute value is based on an emphasis value determined from the degree of importance, interest or attractiveness of the image relative to other images in the group of images.

18. The computer program product as claimed in claim 15 wherein the image processing attribute value is used to preferentially allocate the computational resources of the image processing path for the image.

19. The computer program product as claimed in claim 15 wherein the image processing attribute value is used to control at least one of a noise reduction algorithm and a spatial interpolation algorithm.

20. A system for varying the image processing path for a digital image, said system comprising:

(a) an input stage for receiving a group of digital images;

(b) a processing stage for computing an image processing attribute value for each digital image based on a determination of the degree of importance, interest or attractiveness of each digital image relative to other digital images in the group of digital images;

(c) a plurality of image processing modules establishing an image processing path for each digital image; and (d) a controller stage using the image processing attribute value to control the image processing path for each digital image such that those digital images with the lowest degree of importance interest or attractiveness are preferentially processed to raise their processed state of quality nearer to the level of the other digital images within the group of digital images.

21. The system as claimed in claim 20 wherein the image processing attribute value is based on an appeal value determined from the degree of importance, interest or attractiveness that is intrinsic to the image.

22. The system as claimed in claim 20 wherein the image is one of a group of digital images and the image processing attribute value is based on an emphasis value determined from the degree of importance, interest or attractiveness of the image relative to other images in the group of images.

23. The system as claimed in claim 20 wherein the controller stage uses the image processing attribute value to preferentially allocate the computational resources of the image processing path for the image.

24. The system as claimed in claim 20 wherein the controller uses the image processing attribute value to control at least one of a noise reduction algorithm and a spatial interpolation algorithm.

* * * * *